J. GRACIE.
Improvement in Stills for Oil.

No. 114,803.

Patented May 16, 1871.

Witnesses.

Inventor.

United States Patent Office.

JOHN GRACIE, OF PITTSBURG, PENNSYLVANIA.

Letters Patent No. 114,803, dated May 16, 1871.

IMPROVEMENT IN STILLS FOR OIL.

The Schedule referred to in these Letters Patent and making part of the same.

*To all whom it may concern:*

Be it known that I, JOHN GRACIE, of Pittsburg, in the county of Allegheny and State of Pennsylvania, have invented a new and useful Improvement in Stills for Oil; and I do hereby declare that the following is a full, clear, and exact description thereof, reference being had to the accompanying drawing and to the letters of reference marked thereon.

The nature of my invention consists in a horizontal still (in counter-distinction to a vertical still) provided with a flue passing through it a little above its bottom, communicating at one end of the still with a fire-chamber, and at the other end with a smoke-flue or chimney, the whole being so arranged that the required heat is imparted to the oil without the direct application of fire to the bottom of the still.

To enable others skilled in the art to make and use my invention, I will proceed to describe more fully its construction and operation.

In the accompanying drawing, which forms part of my specification—

In the accompanying drawing—

Figure 1:
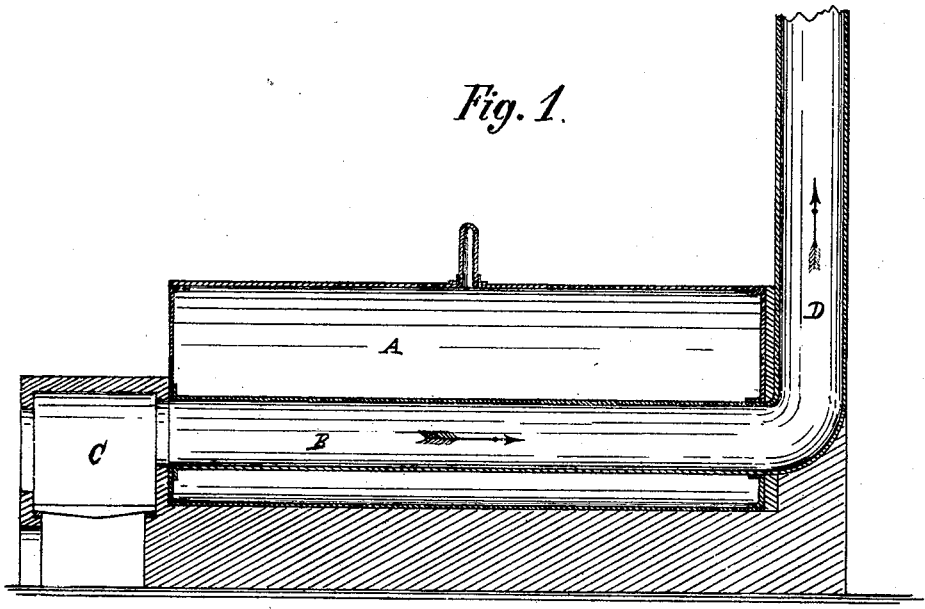
Figure 1 is a longitudinal section of the still and its furnace.
Figure 2:
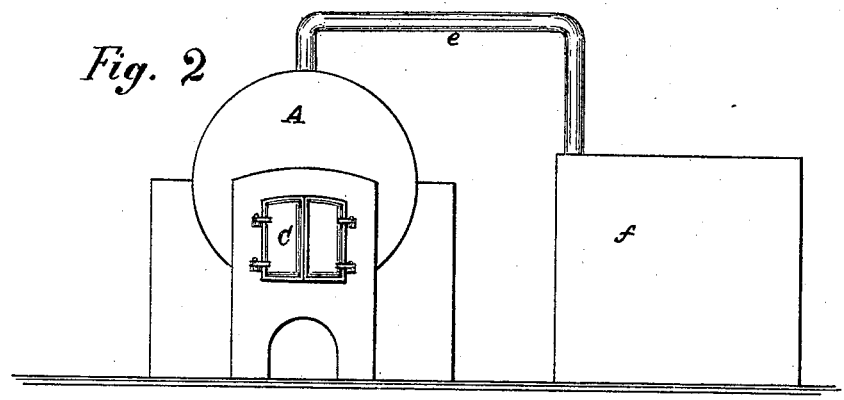
Figure 2 is an end elevation of the still, furnace, and condenser.

A represents a cylindrical still provided with a flue, B, which is arranged in the still a little above the bottom of the still.

One end of the flue B communicates with a fire-chamber, C, and the other end of it with a smoke-flue or chimney, D.

The still A is provided with a condensing-pipe, *e*, and condenser *f*, which pipe and condenser are of the ordinary construction. The still is supplied with oil in the usual manner, and operated in the ordinary mode, except that the oil is heated to the evolving point by the fire and heat passing through the flue B without the direct application of heat to any portion of the shell or body of the still.

I am aware that stills have been constructed with a series of flues, which flues have been surrounded with water within a case or flue, such as described in Letters Patent granted to A. Dubrenil, June 20, 1865, and numbered 48,265; and also that a flue or flues have been used in evaporating-pans or vessels used in the manufacture of sugar and salt; therefore I do not claim, broadly, a horizontal still provided with a flue or flues; but it will be observed that, in the application of heat to oil, it is applied directly to it through the medium of the flue B in my still, while in that of A. Dubrenil, hereinbefore referred to, the heat of the fire is first transmitted to the water around the flues, and then transmitted from the water to the oil through the medium of a flue or casing, within which water and flues are placed.

In the case of evaporating-pans or vessels provided with flues, used for the evaporation liquor in the manufacture of salt or sugar, the vessels or pans are open or uncovered, and would not answer for the distilling of hydrocarbon oils.

The advantage of constructing a still for oil so that the direct heat of the fire is applied to the oil at a point above the bottom of the still consists in saving the still from burning out, and evolving the oil with a less degree of heat, by allowing the gross matter in the oil to settle down on the bottom of the still.

What I claim as of my invention is—

In counter-distinction to a vertical still for hydrocarbon oil, a horizontal still A, the bottom of which is free from the direct application of distilling or decomposing heat, combined with a flue or flues, B, and condensing apparatus, substantially as described.

JOHN GRACIE.

Witnesses:
GEO. H. THOMAS,
JAMES J. JOHNSTON.